US008078721B2

(12) United States Patent
Droms et al.

(10) Patent No.: US 8,078,721 B2
(45) Date of Patent: Dec. 13, 2011

(54) DYNAMIC HOST CONFIGURATION PROTOCOL (DHCP) INITIALIZATION RESPONSIVE TO A LOSS OF NETWORK LAYER CONNECTIVITY

(75) Inventors: Ralph Droms, Westford, MA (US); Vitali Vinokour, Arlington, MA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 12/204,781

(22) Filed: Sep. 4, 2008

(65) Prior Publication Data
US 2009/0210522 A1 Aug. 20, 2009

Related U.S. Application Data

(60) Provisional application No. 61/029,190, filed on Feb. 15, 2008.

(51) Int. Cl.
*G06F 15/173* (2006.01)

(52) U.S. Cl. ....... 709/224; 709/222; 709/228; 714/47.1; 714/48

(58) Field of Classification Search .......... 709/220–224, 709/227–228; 714/47.1, 48
See application file for complete search history.

(56) References Cited

U.S. PATENT DOCUMENTS

| | | | | |
|---|---|---|---|---|
| 7,002,932 B1 * | 2/2006 | Young et al. | | 370/312 |
| 7,587,518 B2 * | 9/2009 | Bahl | | 709/245 |
| 7,640,287 B1 * | 12/2009 | Gai et al. | | 709/200 |
| 7,860,981 B1 * | 12/2010 | Vinokour et al. | | 709/227 |
| 7,869,372 B2 * | 1/2011 | Robertson et al. | | 370/241 |
| 2002/0178397 A1 * | 11/2002 | Ueno et al. | | 714/4 |
| 2003/0142642 A1 * | 7/2003 | Agrawal et al. | | 370/328 |
| 2005/0086385 A1 * | 4/2005 | Rouleau | | 709/249 |
| 2007/0165533 A1 * | 7/2007 | Wu | | 370/242 |
| 2008/0071890 A1 * | 3/2008 | Meier et al. | | 709/220 |
| 2009/0003268 A1 * | 1/2009 | Kesavan et al. | | 370/328 |
| 2009/0113073 A1 * | 4/2009 | Koide et al. | | 709/245 |
| 2009/0300178 A1 * | 12/2009 | Saunderson et al. | | 709/224 |
| 2009/0323631 A1 * | 12/2009 | Bajic | | 370/331 |
| 2010/0005288 A1 * | 1/2010 | Rao et al. | | 713/151 |

FOREIGN PATENT DOCUMENTS

WO 9826530 A1 6/1998

OTHER PUBLICATIONS

Droms, "Dynamic Host Configuration Protocol," RFC 2131, The Internet Society, Mar. 1997, 47 pages.
Katz & Ward, "Generic Application of BFD," draft-ietf-bfd-generic-04.txt, Internet Engineering Task Force, Jan. 2008, 19 pages.

(Continued)

*Primary Examiner* — Abdullahi Salad
(74) *Attorney, Agent, or Firm* — The Law Office of Kirk D. Williams

(57) ABSTRACT

Disclosed are, inter alia, methods, apparatus, computer-storage media, mechanisms, and means associated with loss of network layer connectivity triggering Dynamic Host Configuration Protocol (DHCP) initialization. According to one embodiment, a network device connected to a network initializes one or more network communication values of the network device using DHCP. The network device monitors Network Layer (Layer 3) connectivity with a remote network device; and in response to detecting a loss of said monitored Network Layer connectivity, DHCP initialization of the network device is performed.

25 Claims, 4 Drawing Sheets

OTHER PUBLICATIONS

Katz & Ward, "BFD for IPv4 and IPv6 (Single Hop)," draft-ietf-bfd-v4v6-1hop-07.txt, Internet Engineering Task Force, Jan. 2008, 8 pages.

Katz & Ward, "Bidirectional Forwarding Detection," draft-ietf-bfd-base-07.txt, Internet Engineering Task Force, Jan. 2008, 48 pages.

Droms et al., "Dynamic Host Configuration Protocol for IPv6 (DHCPv6)," RFC 3315, The Internet Society, Jul. 2003, 101 pages.

Patrick, "DHCP Relay Agent Information Option," RFC 3046, The Internet Society, Jan. 2001, 14 pages.

Droms & Haberman, "Softwires Network Address Translation (SNAT)," The IEFT Trust, draft-droms-softwires-snat-00.txt, Feb. 18, 2008, 15 pages.

Bernstein & Spets, Eds., "CPE WAN Management Protocol," DSL Forum TR-069, May 2004, 109 pages.

Bradner, "Key words for use in RFCs to Indicate Requirement Levels," RFC 2119, Mar. 1997, 3 pages.

Droms, "Procedures and IANA Guidelines for Definition of New DHCP Options and Message Types," RFC 2939, The Internet Society, Sep. 2000, 7 pages.

Aboba et al., "Detecting Network Attachment in IPv4 (DNAv4)," RFC 4436, The Internet Society, Mar. 2006, 15 pages.

"Subscriber Sessions," Working Text WT-146 Draft Version 2.6, DSL Forum, Nov. 26, 2007 (31 pages).

Vitali Vinokour and Wojciech Dec, "Changes to IP Session Monitoring Requirements," DSLForum2007.674.00, DSL Forum, Dec. 10-13, 2007 (4 pages).

Vitali Vinokour and Wojciech Dec, "Changes to IP Session Monitoring Requirements," DSLForum2007.674.01, DSL Forum, Dec. 10-13, 2007 (10 pages).

* cited by examiner

DYNAMIC HOST CONFIGURATION PROTOCOL (DHCP) INITIALIZATION RESPONSIVE TO A LOSS OF NETWORK LAYER CONNECTIVITY

CROSS-REFERENCE TO RELATED APPLICATIONS

This application claims the benefit of U.S. Provisional Application No. 61/029,190, filed Feb. 15, 2008, which is hereby incorporated by reference in its entirety.

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

Dynamic Host Configuration Protocol (DHCP) is used to manage assignment of network parameters in a network. For example, a DHCP-enabled device will send a broadcast query requesting network configuration information for the device from a DHCP server, which the server provides to the device.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
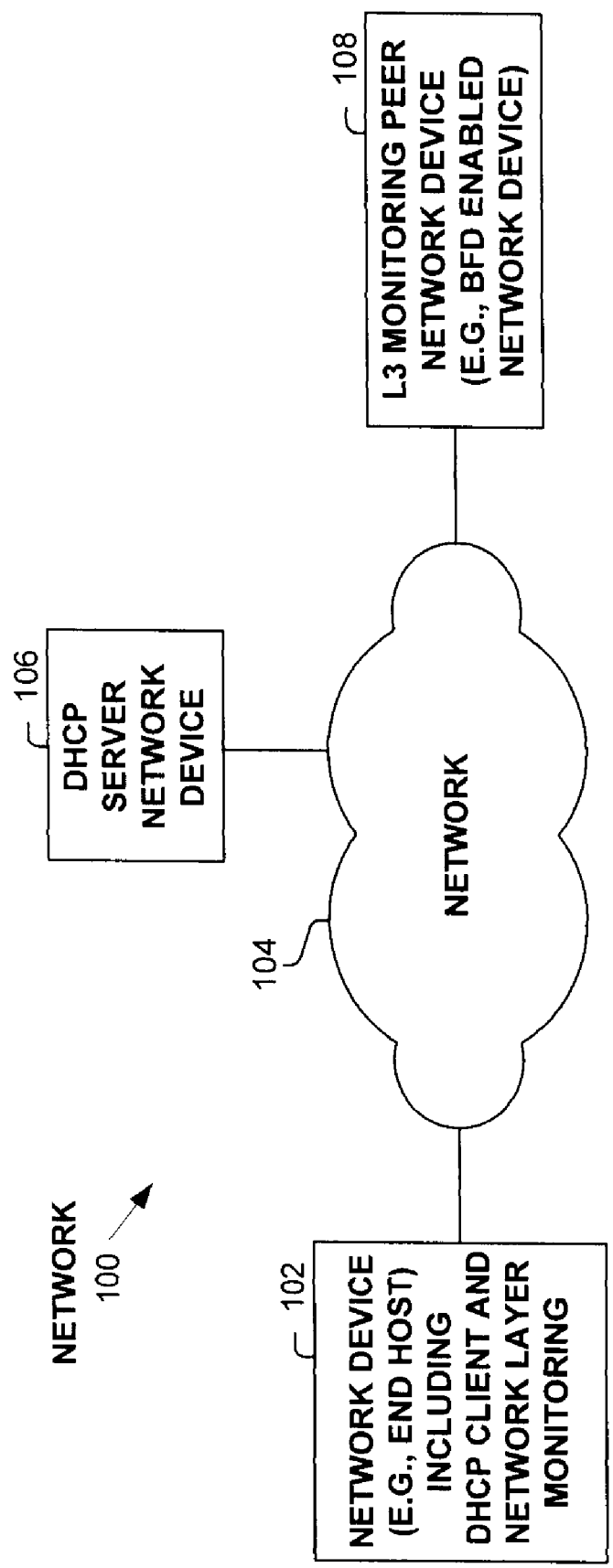
FIG. 1A illustrates a network operating according to one embodiment.

Disclosed are, inter alia, methods, apparatus, computer-storage media, mechanisms, and means associated with loss of network layer connectivity triggering Dynamic Host Configuration Protocol (DHCP) initialization. According to one embodiment, a network device connected to a network initializes one or more network communication values of the network device using DHCP. The network device monitors Network Layer (Layer 3) connectivity with a remote network device; and in response to detecting a loss of said monitored Network Layer connectivity, DHCP initialization of the network device is performed.

In one embodiment, said one or more network values includes a particular network address; and said DHCP initialization is performed with the particular network address. In one embodiment, said DHCP initialization with the particular network address includes entering a DHCP INIT-REBOOT state and sending a DHCPREQUEST message to a DHCP server. In one embodiment, said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session. In one embodiment, the network device maintains Data Link Layer (L2) connectivity on a particular network interface of the network device during said operations of said detecting a loss of said monitored Network Layer connectivity and said performing DHCP initialization of the network device, wherein said monitoring Network Layer (Layer 3) connectivity with the remote network device is performed over the particular network interface. In one embodiment, said DHCP initialization of the network device includes performing DHCP initialization from a DHCP INIT state.

2. Description

Disclosed are, inter alia, methods, apparatus, computer-storage media, mechanisms, and means associated with loss of network layer connectivity triggering Dynamic Host Configuration Protocol (DHCP) initialization.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with loss of network layer connectivity triggering Dynamic Host Configuration Protocol (DHCP) initialization. One embodiment includes an apparatus comprising: one or more network interfaces configured to communicate over a network, including with a Dynamic Host Configuration Protocol (DHCP) server; and one or more processing elements configured: (a) to set one or more network communication values of the apparatus using DHCP in communication with the DHCP server, with said one or more communications values including a particular network address; (b) to monitor Network Layer (Layer 3) connectivity; and (c) to cause the apparatus, in response to a loss of said monitored Network Layer connectivity, to perform DHCP initialization with the particular network address.

In one embodiment, said causing the apparatus, in response to the loss of said monitored Network Layer connectivity, to perform DHCP initialization with the particular network address includes causing said initialization despite maintaining Data Link Layer (L2) connectivity on a particular interface of said one or more interfaces, wherein said detected loss of said monitored Network Layer connectivity is on the particular interface. In one embodiment, claim 1, said DHCP initialization with the particular network address includes the apparatus entering a DHCP INIT-REBOOT state and sending a DHCPREQUEST message to the DHCP server. In one embodiment, said monitoring L3 connectivity includes using a Bidirectional Forwarding Detection (BFD) session with a remote networked device. In one embodiment, said causing the apparatus, in response to the loss of said monitored Network Layer connectivity, to perform DHCP initialization with the particular network address includes causing said initialization despite maintaining Data Link Layer (L2) connectivity on a particular interface of said one or more interfaces, wherein the BFD session is communicated via the particular interface. In one embodiment, said one or more processing elements are configured to restart the DHCP initialization process in response to receiving a DHCPNAK message from the DHCP server in response to said DHCPREQUEST message sent to the DHCP server. In one embodiment, said monitoring L3 connectivity includes using a Bidirectional Forwarding Detection (BFD) session with a remote networked device. In one embodiment, said causing the apparatus, in response to the loss of said monitored Network Layer connectivity, to perform DHCP initialization with the particular network address includes causing said initialization despite maintaining Data Link Layer (L2) connectivity on a particular interface of said one or more interfaces, wherein the BFD session is communicated via the particular interface.

One embodiment includes an apparatus, comprising: one or more network interfaces configured to communicate over a network, including with a Dynamic Host Configuration Protocol (DHCP) server; and one or more processing elements configured: (a) to set one or more network communication values of the apparatus using DHCP in communication with the DHCP server, with said one or more communications values including a network address; (b) to monitor Network Layer (Layer 3) connectivity; and (c) to cause the apparatus, in response to a loss of said monitored Network Layer connectivity, to perform DHCP initialization from a DHCP INIT state. In one embodiment, said monitoring L3 connectivity includes using a Bidirectional Forwarding Detection (BFD) session with a remote networked device. In one embodiment, said causing the apparatus, in response to the loss of said monitored Network Layer connectivity, to perform DHCP initialization from a DHCP INIT state includes causing said initialization despite maintaining Data Link Layer (L2) connectivity on a particular interface of said one or more interfaces, wherein said detected loss of said monitored Network Layer connectivity is on the particular interface.

One embodiment includes a method performed by a network device connected to a network, with the method comprising: initializing one or more network communication values of the network device using Dynamic Host Configuration Protocol (DHCP); monitoring Network Layer (Layer 3) connectivity with a remote network device; and in response to detecting a loss of said monitored Network Layer connectivity, performing DHCP initialization of the network device.

In one embodiment, said one or more network values includes a particular network address; and said DHCP initialization is performed with the particular network address. In one embodiment, said DHCP initialization with the particular network address includes entering a DHCP INIT-REBOOT state and sending a DHCPREQUEST message to a DHCP server. In one embodiment, said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session. In one embodiment, the network device maintains Data Link Layer (L2) connectivity on a particular network interface of the network device during said operations of said detecting a loss of said monitored Network Layer connectivity and said performing DHCP initialization of the network device, wherein said monitoring Network Layer (Layer 3) connectivity with the remote network device is performed over the particular network interface. In one embodiment, said DHCP initialization of the network device includes performing DHCP initialization from a DHCP INIT state. In one embodiment, said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session. In one embodiment, said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session. In one embodiment, the network device maintains Data Link Layer (L2) connectivity on a particular network interface of the network device during said operations of said detecting a loss of said monitored Network Layer connectivity and said performing DHCP initialization of the network device, wherein said monitoring Network Layer (Layer 3) connectivity with the remote network device is performed over the particular network interface.

One embodiment includes an apparatus, comprising: means for initializing one or more network communication values of the apparatus using Dynamic Host Configuration Protocol (DHCP); means for monitoring Network Layer (Layer 3) connectivity with a remote network device of a network; and means for performing DHCP initialization of the network device in response to detecting a loss of said monitored Network Layer connectivity.

Expressly turning to the figures, FIG. 1A illustrates a network 100 operating according to one embodiment. Network device 102 is configured for using DHCP to communicate with DHCP server 106 over network 104 to initialize one or more network parameters. Network device 102 is also configured for monitoring network layer (L3) connectivity, such as with remote network layer (L3) monitoring peer network device 108 over network 104. In response to determining a loss of L3 connectivity, network device 102 initiates a DHCP initialization procedure (e.g., initializes using the same network address by entering the DHCP INIT-REBOOT state and sending a DHCPREQUEST message to DHCP server 106; initializes by entering the DHCP INIT state and sending a DHCPDISCOVER message). In one embodiment, network device 102 monitors network layer (L3) connectivity via a Bidirectional Forwarding Detection (BFD) session with network device 108.

Figure 1B:
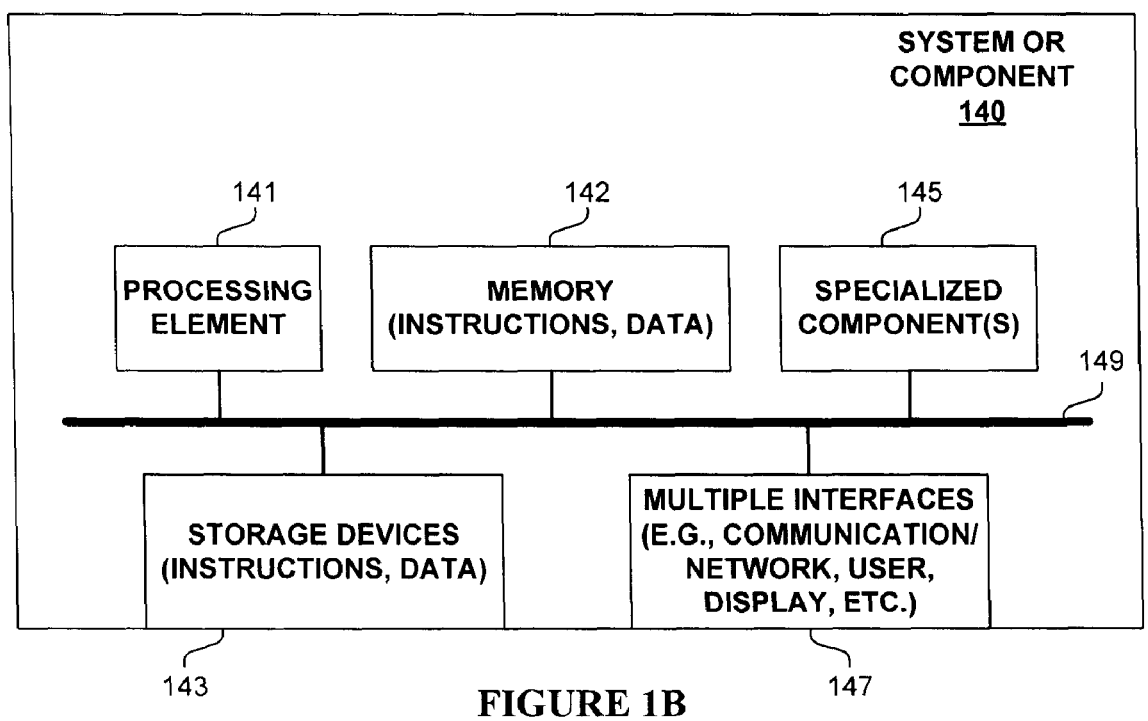
FIG. 1B illustrates an example system or component used in one embodiment.

FIG. 1B is block diagram of a system or component 140 used in one embodiment associated with loss of network layer connectivity triggering Dynamic Host Configuration Protocol (DHCP) initialization. In one embodiment, system or component 140 performs one or more processes corresponding to one of the flow diagrams illustrated or otherwise described herein.

In one embodiment, system or component 140 includes a processing element 141, memory 142, storage devices 143, specialized components 145 (e.g. optimized hardware such as for performing operations, etc.), and interface(s) 147 for communicating information (e.g., sending and receiving packets, user-interfaces, displaying information, etc.), which are typically communicatively coupled via one or more communications mechanisms 149, with the communications paths typically tailored to meet the needs of the application. In one embodiment system or component 140 corresponds to, or is part of, network device 102, 106 or 108 of FIG. 1A.

Various embodiments of component 140 may include more or less elements. The operation of component 140 is typically controlled by processing element 141 using memory 142 and storage devices 143 to perform one or more tasks or processes. Memory 142 is one type of computer-readable/computer-storage medium, and typically comprises random access memory (RAM), read only memory (ROM), flash memory, integrated circuits, and/or other memory components. Memory 142 typically stores computer-executable instructions to be executed by processing element 141 and/or data which is manipulated by processing element 141 for implementing functionality in accordance with an embodiment. Storage devices 143 are another type of computer-readable medium, and typically comprise solid state storage media, disk drives, diskettes, networked services, tape drives, and other storage devices. Storage devices 143 typically store computer-executable instructions to be executed by processing element 141 and/or data which is manipulated by processing element 141 for implementing functionality in accordance with an embodiment.

Figure 2:
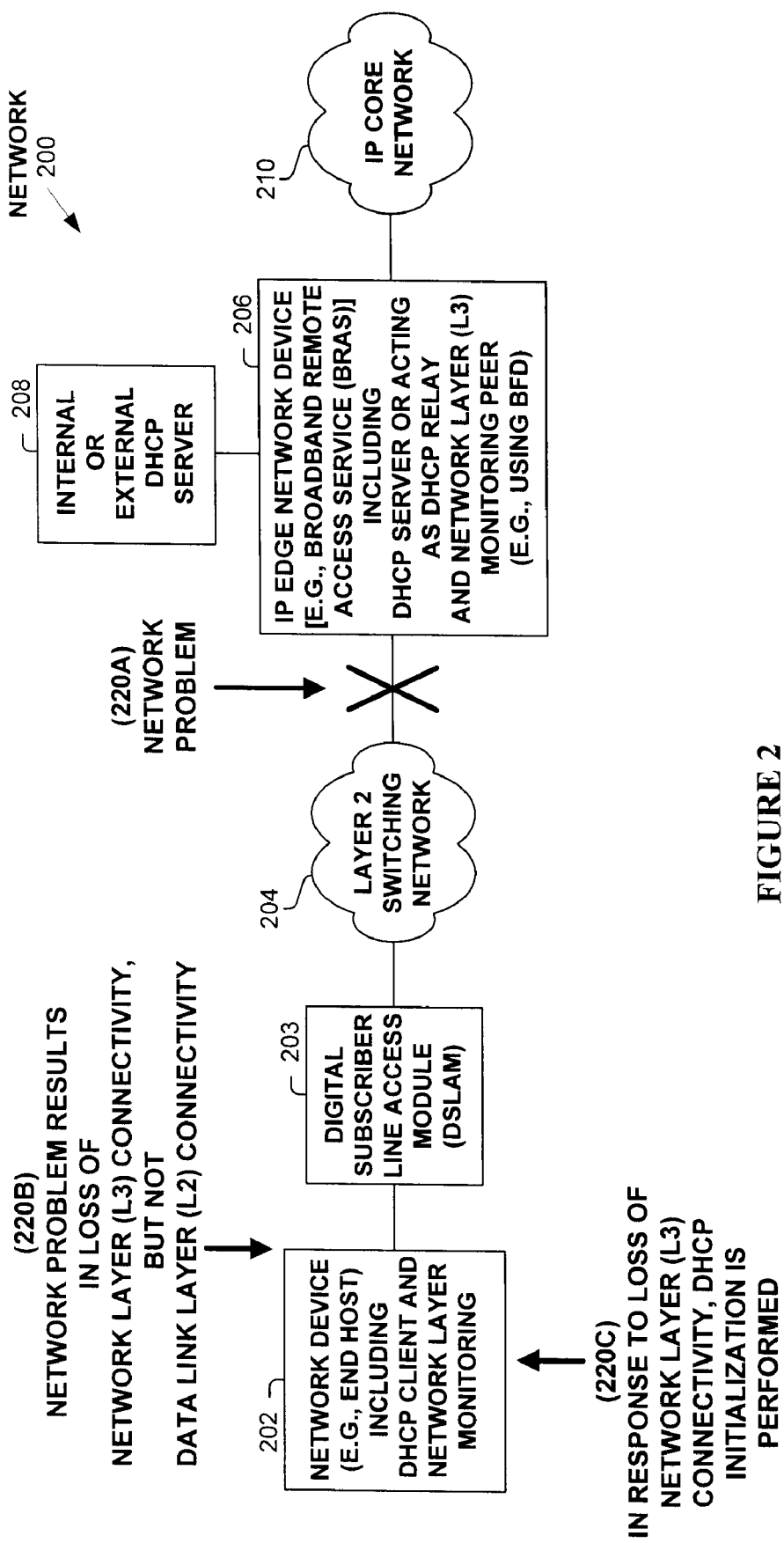
FIG. 2 illustrates a network operating according to one embodiment.

FIG. 2 illustrates a network 200 operating according to one embodiment, including being annotated with a loss of network layer (L3) connectivity scenario triggering initialization of DHCP client 202. In this network configuration, network device 202 is connected via a digital subscriber line access module (DSLAM) 203 to Layer 2 (L2) switching network 204, which is connected to IP edge network device 206, with is connected to IP core network 210. In one embodiment, IP edge network device 206 includes DHCP server 208. In one embodiment, IP edge network device 206 acts as a DHCP relay agent for DHCP server 208. In one embodiment, IP edge network device 206 is a broadband remote access service (BRAS) network device. In one embodiment, IP edge network device 206 is configured to communicate with network device 202 for providing a source for network device 202 to monitor network layer (L3) connectivity, such as, but not limited to using BFD.

FIG. 2 is annotated to illustrate the operation of one embodiment in relation to network device 202 detecting a loss of L3 connectivity, such as due to a network failure, such as illustrated by annotated network problem 220A. Note, it is also possible to administratively cause network device 202 to detect a loss of L3 connectivity and to trigger DHCP initialization such as by configuring IP edge network device 206 to stop sending BFD Hello packets. In this example with the configuration of network 200, network problem 220A will not cause a loss of data link layer (L2) connectivity, but will cause a loss of network layer (L3) connectivity on a same network interface of network device 202, as illustrated by annotation 220B. In response to detecting the loss of network layer (L3) connectivity (annotation 220C), network device 202 performs DHCP initialization (e.g., initializes using the same network address by entering the DHCP INIT-REBOOT state and sending a DHCPREQUEST message to DHCP server 106; initializes by entering the DHCP INIT state and sending a DHCPDISCOVER message).

Figure 3:
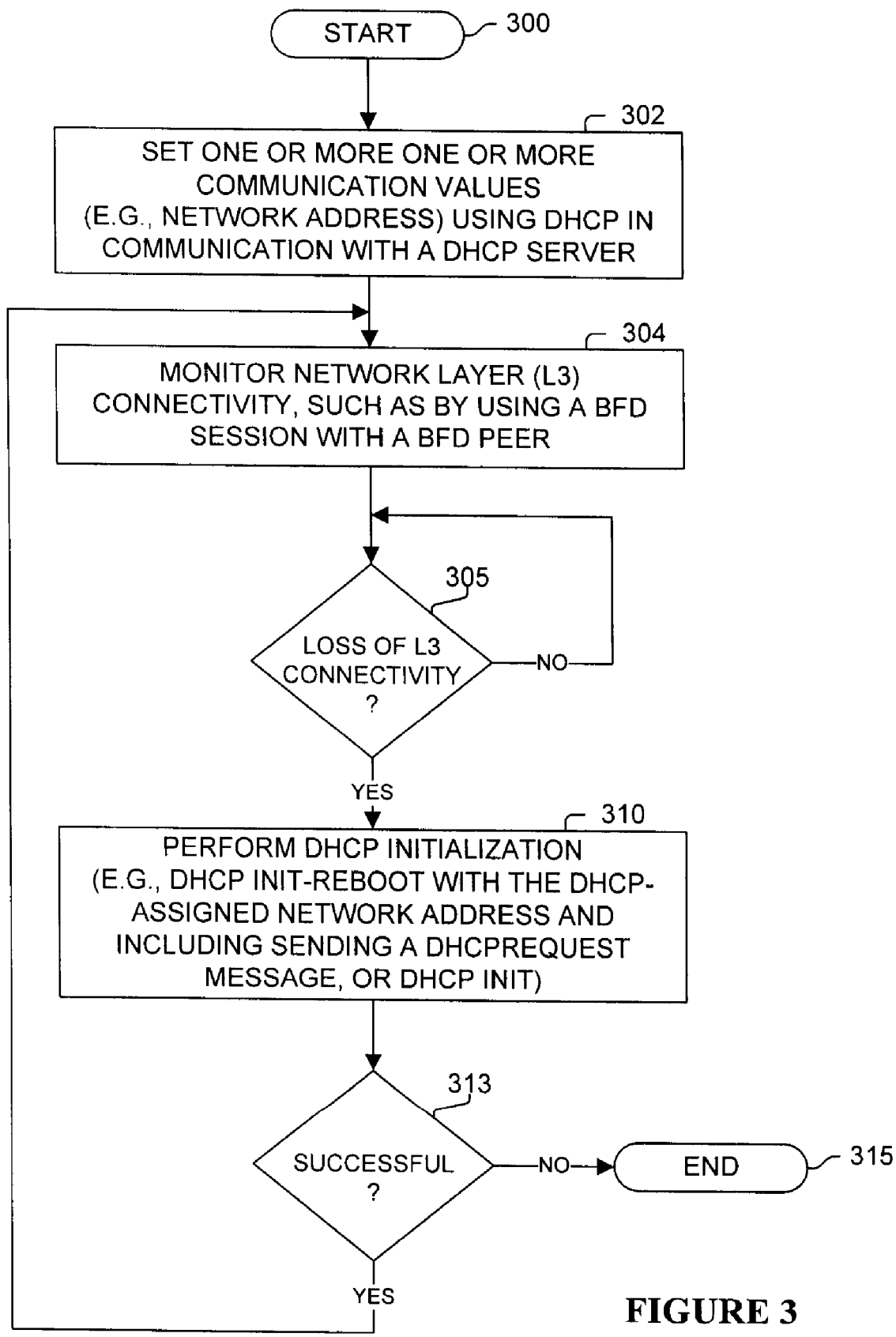
FIG. 3 illustrates a process performed in one embodiment.

FIG. 3 illustrates a process performed by a network device (in one embodiment) configured to perform DHCP initialization in response to a detected loss of network layer (L3) connectivity. Processing begins with process block 300. In process block 302, one or more communication values (e.g., network address, netmask, default gateway, etc.) are set using DHCP in communication with a DHCP server (e.g., directly or via a DHCP relay agent). In process block 304, network layer (L3) connectivity is monitored, such as, but not limited to, using Bidirectional Forwarding Detection (BFD) in communication with a remote BFD peer. Network layer (L3) connectivity is monitored as indicated by process block 305.

In response to loss of network layer (L3) connectivity as determined in process block 305, in process block 310, the network device performs DHCP initialization (e.g., initializes using the same network address by entering the DHCP INIT-REBOOT state and sending a DHCPREQUEST message to DHCP server 106; initializes by entering the DHCP INIT state and sending a DHCPDISCOVER message). As determined in process block 313, if the DHCP initialization is not successful, processing terminates as indicated by process block 315. Otherwise, processing returns to process block 304 to resume network layer (L3) monitoring, such as, but not limited to resuming a BFD session, commencing a new BFD session, or via another mechanism.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   one or more network interfaces configured to communicate over a network, including with a Dynamic Host Configuration Protocol (DHCP) server; and
   one or more processing elements configured: (a) to set one or more network communication values of the apparatus using DHCP in communication with the DHCP server, with said one or more communications values including a particular network address; (b) to monitor Network Layer (L3) connectivity, including detecting a loss of said L3 connectivity; and (c) to cause the apparatus, in response to said detected loss of said L3 connectivity, to perform DHCP initialization with the particular network address.

2. The apparatus of claim 1, wherein said DHCP initialization with the particular network address includes the apparatus entering a DHCP INIT-REBOOT state and sending a DHCPREQUEST message to the DHCP server.

3. The apparatus of claim 2, wherein said monitoring L3 connectivity includes using a Bidirectional Forwarding Detection (BFD) session with a remote networked device; and wherein said detected loss is determined from the BFD session determining a loss in L3 connectivity with the remote network device.

4. The apparatus of claim 3, wherein said causing the apparatus, in response to said detected loss of said L3 connectivity, to perform DHCP initialization with the particular network address includes causing said initialization despite maintaining Data Link Layer (L2) connectivity on a particular interface of said one or more interfaces, wherein the BFD session is communicated via the particular interface.

5. The apparatus of claim 2, wherein said one or more processing elements are configured to restart the DHCP initialization process in response to receiving a DHCPNAK message from the DHCP server in response to said DHCPREQUEST message sent to the DHCP server.

6. The apparatus of claim 1, wherein said monitoring L3 connectivity includes using a Bidirectional Forwarding Detection (BFD) session with a remote networked device; and wherein said detected loss is determined from the BFD session determining a loss in L3 connectivity with the remote network device.

7. The apparatus of claim 6, wherein said causing the apparatus, in response to said detected loss of said L3 connectivity, to perform DHCP initialization with the particular network address includes causing said initialization despite maintaining Data Link Layer (L2) connectivity on a particular interface of said one or more interfaces, wherein the BFD session is communicated via the particular interface.

8. The apparatus of claim 1, wherein the apparatus is an end host.

9. An apparatus, comprising:
   one or more network interfaces configured to communicate over a network, including with a Dynamic Host Configuration Protocol (DHCP) server; and
   one or more processing elements configured: (a) to set one or more network communication values of the apparatus using DHCP in communication with the DHCP server, with said one or more communications values including a particular network address; (b) to monitor Network Layer (Layer 3) connectivity; and (c) to cause the apparatus, in response to a loss of said monitored Network Layer connectivity, to perform DHCP initialization with the particular network address;
   wherein said causing the apparatus, in response to the loss of said monitored Network Layer connectivity, to perform DHCP initialization with the particular network address includes causing said initialization despite maintaining Data Link Layer (L2) connectivity on a particular interface of said one or more interfaces, wherein said detected loss of said monitored Network Layer connectivity is on the particular interface.

10. An apparatus, comprising:
    one or more network interfaces configured to communicate over a network, including with a Dynamic Host Configuration Protocol (DHCP) server; and
    one or more processing elements configured: (a) to set one or more network communication values of the apparatus using DHCP in communication with the DHCP server, with said one or more communications values including a network address; (b) to monitor Network Layer (L3) connectivity, including detecting a loss of said L3 connectivity; and (c) to cause the apparatus, in response to said detected loss of said L3 connectivity, to perform DHCP initialization from a DHCP INIT state.

11. The apparatus of claim 10, wherein said monitoring L3 connectivity includes using a Bidirectional Forwarding Detection (BFD) session with a remote networked device; and wherein said detected loss is determined from the BFD session determining a loss in L3 connectivity with the remote network device.

12. The apparatus of claim 11, wherein said causing the apparatus, in response to said detected loss of said L3 connectivity, to perform DHCP initialization from a DHCP INIT state includes causing said initialization despite maintaining Data Link Layer (L2) connectivity on a particular interface of said one or more interfaces, wherein said detected loss said determined from the BFD session is on the particular interface.

13. The apparatus of claim 10, wherein the apparatus is an end host.

14. A method performed by a network device connected to a network, the method comprising:
    initializing one or more network communication values of the network device using Dynamic Host Configuration Protocol (DHCP);
    monitoring Network Layer (Layer 3) connectivity with a remote network device; and
    in response to detecting a loss of said monitored Network Layer connectivity, performing DHCP initialization of the network device.

15. The method of claim 14, wherein said one or more network values includes a particular network address; and said DHCP initialization is performed with the particular network address.

16. The method of claim 15, wherein said DHCP initialization with the particular network address includes entering a DHCP INIT-REBOOT state and sending a DHCPREQUEST message to a DHCP server.

17. The method of claim 16, wherein said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session.

18. The method of claim 17, wherein the network device maintains Data Link Layer (L2) connectivity on a particular network interface of the network device during said operations of said detecting a loss of said monitored Network Layer connectivity and said performing DHCP initialization of the network device, wherein said monitoring Network Layer (Layer 3) connectivity with the remote network device is performed over the particular network interface.

19. The method of claim 14, wherein said DHCP initialization of the network device includes performing DHCP initialization from a DHCP INIT state.

20. The method of claim 19, wherein said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session.

21. The method of claim 14, wherein said monitoring Network Layer (Layer 3) connectivity includes establishing a Bidirectional Forwarding Detection (BFD) session with a remote networked device; and wherein said detecting the loss of said monitored Network Layer connectivity occurs based on the BFD session.

22. The method of claim 14, wherein the network device maintains Data Link Layer (L2) connectivity on a particular network interface of the network device during said operations of said detecting a loss of said monitored Network Layer connectivity and said performing DHCP initialization of the network device, wherein said monitoring Network Layer (Layer 3) connectivity with the remote network device is performed over the particular network interface.

23. The method of claim 14, wherein the network device is an end host.

24. An apparatus, comprising:
   means for initializing one or more network communication values of the apparatus using Dynamic Host Configuration Protocol (DHCP);
   means for monitoring Network Layer (Layer 3) connectivity with a remote network device of a network; and
   means for performing DHCP initialization of the network device in response to detecting a loss of said monitored Network Layer connectivity.

25. The apparatus of claim 24, wherein the apparatus is an end host.

* * * * *